United States Patent
Hockett et al.

(10) Patent No.: US 10,749,773 B2
(45) Date of Patent: Aug. 18, 2020

(54) DETERMINING A LOCATION OF OPTIMAL COMPUTING RESOURCES FOR WORKLOADS

(71) Applicant: International Business Machines Corporation, Armonk, NY (US)

(72) Inventors: Hugh Edward Hockett, Raleigh, NC (US); Lin Sun, Cary, NC (US); Aaron James Quirk, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 16/029,197

(22) Filed: Jul. 6, 2018

(65) Prior Publication Data
US 2020/0014609 A1   Jan. 9, 2020

(51) Int. Cl.
H04L 12/26   (2006.01)
H04L 29/08   (2006.01)

(52) U.S. Cl.
CPC ......... H04L 43/08 (2013.01); H04L 67/1002 (2013.01); H04L 67/18 (2013.01)

(58) Field of Classification Search
CPC ...... H04L 67/18; H04L 67/1002; H04L 43/08
See application file for complete search history.

(56) References Cited

U.S. PATENT DOCUMENTS

| 8,087,025 | B1* | 12/2011 | Graupner ............... G06F 9/505 718/104 |
| 9,195,509 | B2 | 11/2015 | Bartfai-Walcott et al. |
| 9,317,332 | B2 | 4/2016 | Clark et al. |
| 10,346,204 | B2* | 7/2019 | Ginis ..................... G06F 9/5005 |
| 2013/0191528 | A1 | 7/2013 | Heninger et al. |
| 2014/0047272 | A1 | 2/2014 | Breternitz et al. |
| 2015/0199215 | A1* | 7/2015 | Mankovskii .......... G06F 9/5094 718/102 |
| 2015/0227397 | A1* | 8/2015 | Gogula ................. G06F 9/5094 718/104 |
| 2016/0094639 | A1 | 3/2016 | Bhattacharyya et al. |

OTHER PUBLICATIONS

David Ferraiolo, "Cloud Computing" Created Dec. 1, 2016, Updated Oct. 6, 2017 [Accessed Online <https://csrc.nist.gov/projects/cloud-computing> ] 2 pages.

Deploy virtual machines on Azure in multiple datacenters, Apr. 27, 2015 [ Accessed Onlin https://technet.microsoft.com/en-us/library/dn509535.aspx].

* cited by examiner

*Primary Examiner* — Azizul Choudhury
(74) *Attorney, Agent, or Firm* — Patterson + Sheridan, LLP

(57) ABSTRACT

Embodiments provide optimized deployment of workloads. A first workload to be deployed in at least one data center of a plurality of data centers is received. A first plurality of candidate data centers is selected from the plurality of data centers, and the first workload is deployed to each of the first plurality of candidate data centers. A first performance metric is collected from each respective data center of the first plurality of candidate data centers based on execution of the first workload deployed at the respective data centers, and a first optimal data center from the first plurality of candidate data centers is identified based on the first performance metrics. The first workload is removed from each of the first plurality of candidate data centers, other than the identified first optimal data center.

20 Claims, 9 Drawing Sheets

DETERMINING A LOCATION OF OPTIMAL COMPUTING RESOURCES FOR WORKLOADS

BACKGROUND

The present invention relates to workload deployment, and more specifically, to identifying optimal data centers for deployment of workloads.

Providers of cloud services frequently manage a number of servers, which can be spread across several data centers in disparate geographic locations. Cloud providers may offer cloud services in the form of software as a service (SaaS), platform as a service (PaaS), infrastructure as a service (IaaS), and the like. These services can generally be accessed from any physical location and on any device that is connected to the network. In some cloud services, clients of the cloud provider provide workloads to be deployed in the cloud (i.e., on one or more servers that make up the cloud). The cloud provider then selects one or more data centers on which to deploy the workload. However, with increasing numbers of data centers under the control of the cloud provider, it is difficult or impossible to choose a data center that provides the best fit for the workload.

SUMMARY

According to one embodiment of the present disclosure, a method is provided. The method includes receiving a first workload to be deployed in at least one data center of a plurality of data centers of a cloud provider. The method further includes selecting a first plurality of candidate data centers from the plurality of data centers, and deploying the first workload to each of the first plurality of candidate data centers. Additionally, the method includes collecting a first performance metric from each respective data center of the first plurality of candidate data centers based on execution of the first workload deployed at the respective data centers, and identifying a first optimal data center from the first plurality of candidate data centers based on the first performance metrics. Finally, the method includes removing the first workload from each of the first plurality of candidate data centers, other than the identified first optimal data center.

According to a second embodiment of the present disclosure, a computer program product is disclosed. The computer program product includes a computer-readable storage medium having computer-readable program code embodied therewith, the computer-readable program code executable by one or more computer processors to perform an operation. The operation includes receiving a first workload to be deployed in at least one data center of a plurality of data centers of a cloud provider. The operation further includes selecting a first plurality of candidate data centers from the plurality of data centers, and deploying the first workload to each of the first plurality of candidate data centers. Additionally, the operation includes collecting a first performance metric from each respective data center of the first plurality of candidate data centers based on execution of the first workload deployed at the respective data centers, and identifying a first optimal data center from the first plurality of candidate data centers based on the first performance metrics. Finally, the operation includes removing the first workload from each of the first plurality of candidate data centers, other than the identified first optimal data center.

According to a third embodiment of the present disclosure, a system is provided. The system includes one or more computer processors, and a memory containing a program which when executed by the one or more computer processors performs an operation. The operation includes receiving a first workload to be deployed in at least one data center of a plurality of data centers of a cloud provider. The operation further includes selecting a first plurality of candidate data centers from the plurality of data centers, and deploying the first workload to each of the first plurality of candidate data centers. Additionally, the operation includes collecting a first performance metric from each respective data center of the first plurality of candidate data centers based on execution of the first workload deployed at the respective data centers, and identifying a first optimal data center from the first plurality of candidate data centers based on the first performance metrics. Finally, the operation includes removing the first workload from each of the first plurality of candidate data centers, other than the identified first optimal data center.

DETAILED DESCRIPTION

Figure 1:
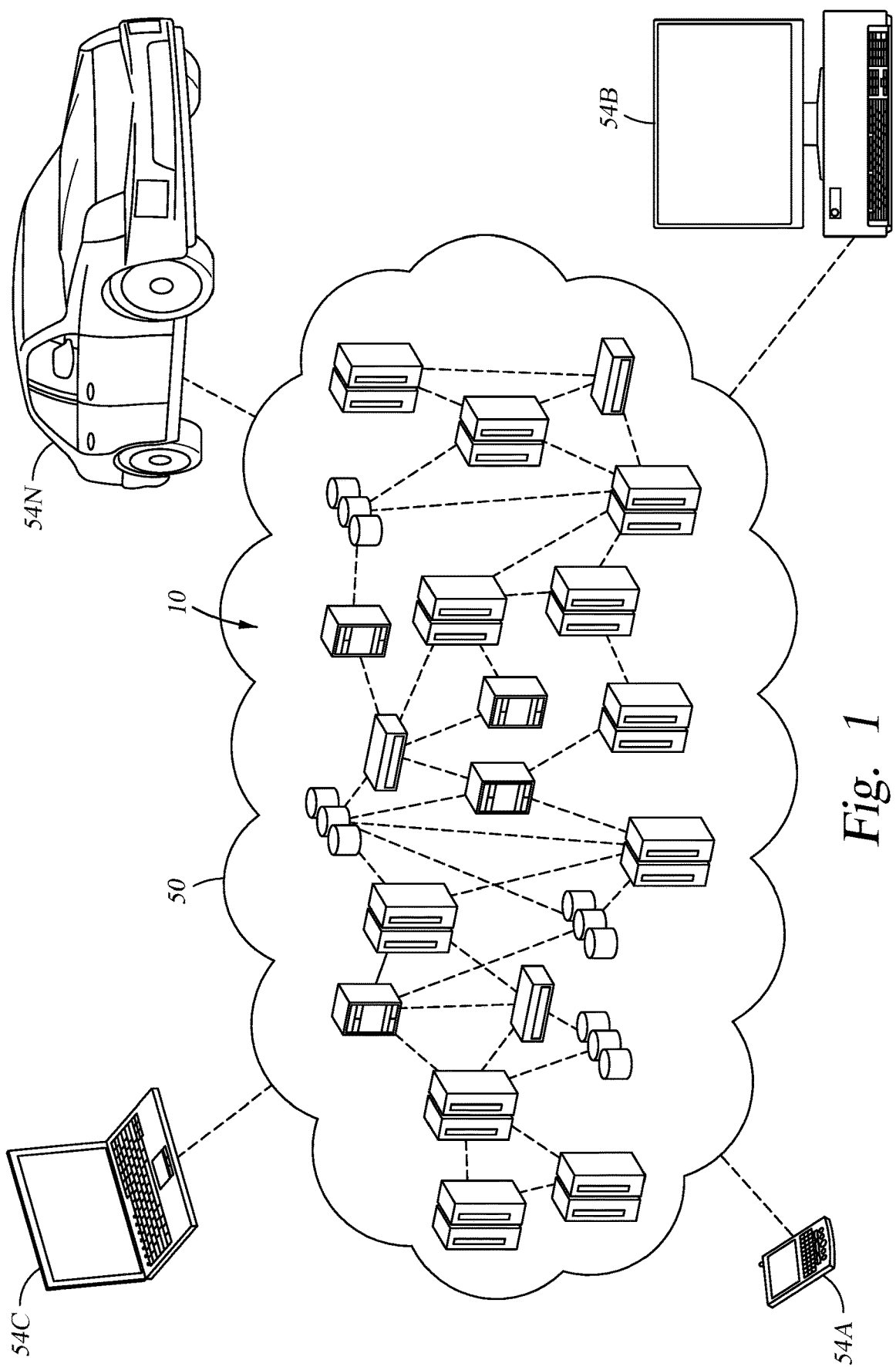
FIG. 1 depicts a cloud computing environment according to an embodiment of the present disclosure.

In some existing cloud solutions, workloads can be deployed to multiple data centers or servers in order to provide fail-safes that allow for disaster recovery. For example, deploying the workload on multiple servers provides for improved reliability in the event that one of the servers fails. Similarly, in some cloud solutions, clients may select one or more data centers to deploy their workloads on. Frequently, clients wish to deploy their workloads on the most optimal server, in order to ensure high-quality service. However, determining the most optimal server is impossible using existing methods. Depending on the needs of the particular workload, the client may prefer to optimize latency, throughput, performance, cost, or any number of other metrics. Similarly, a client may wish to optimize a combination of these factors. Because of the dynamic nature of cloud services, however, there are no existing systems to determine which data center(s) will provide the best fit for the particular needs of the client and workload.

Embodiments of the present disclosure use effectively simultaneous deployments of a single workload across a number of data centers to identify an optimal placement for the workload. Performance metrics can be collected from the multiple deployments and monitored to assess the performance of each workload deployment on each data center. Embodiments of the present disclosure can use these metrics to identify one or more optimal servers or data centers in the cloud for deploying the workload. Sub-optimal deployments can then be terminated in order to free cloud resources for other workloads.

Some embodiments of the present disclosure may include one or more of the following features, advantages, operations and/or characteristics: (i) determining one or more optimal locations for workload deployment by utilizing a set of parameters obtained by running and/or executing a test script across a plurality of sites and deriving a plurality of deployment instances; (ii) comparing the parameter values for the plurality of deployment instances to determine the best site(s) for running or executing a workload on the deployment; (iii) deploying multiple instances of an application server to multiple targets in parallel (more than the user/client will need in the end); (iv) with each of those deployments a set of tests/policies are provided to run and observe the most suitable fit(s) (for example, best throughput/latency back to a desired data center); (iv) the location(s) (the number of locations specified by the user at deploy time) that achieve the best fit against the desired tests/policies are kept and the ones that don't are retired; (v) in this way through observation at deployment time, the optimal set of servers that meet the user's needs can be deployed to multiple targets in a fast and verified process; and/or (vi) deploying to multiple cloud locations in parallel, executing a set of tests and policies to determine the best matching deployments, keeping the best matching deployments (number of deployments specified by the user at deployment time), and retiring the rest of the deployments that aren't as good of a fit to obtain a best fit/matching set of servers in an efficient manner.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer often has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
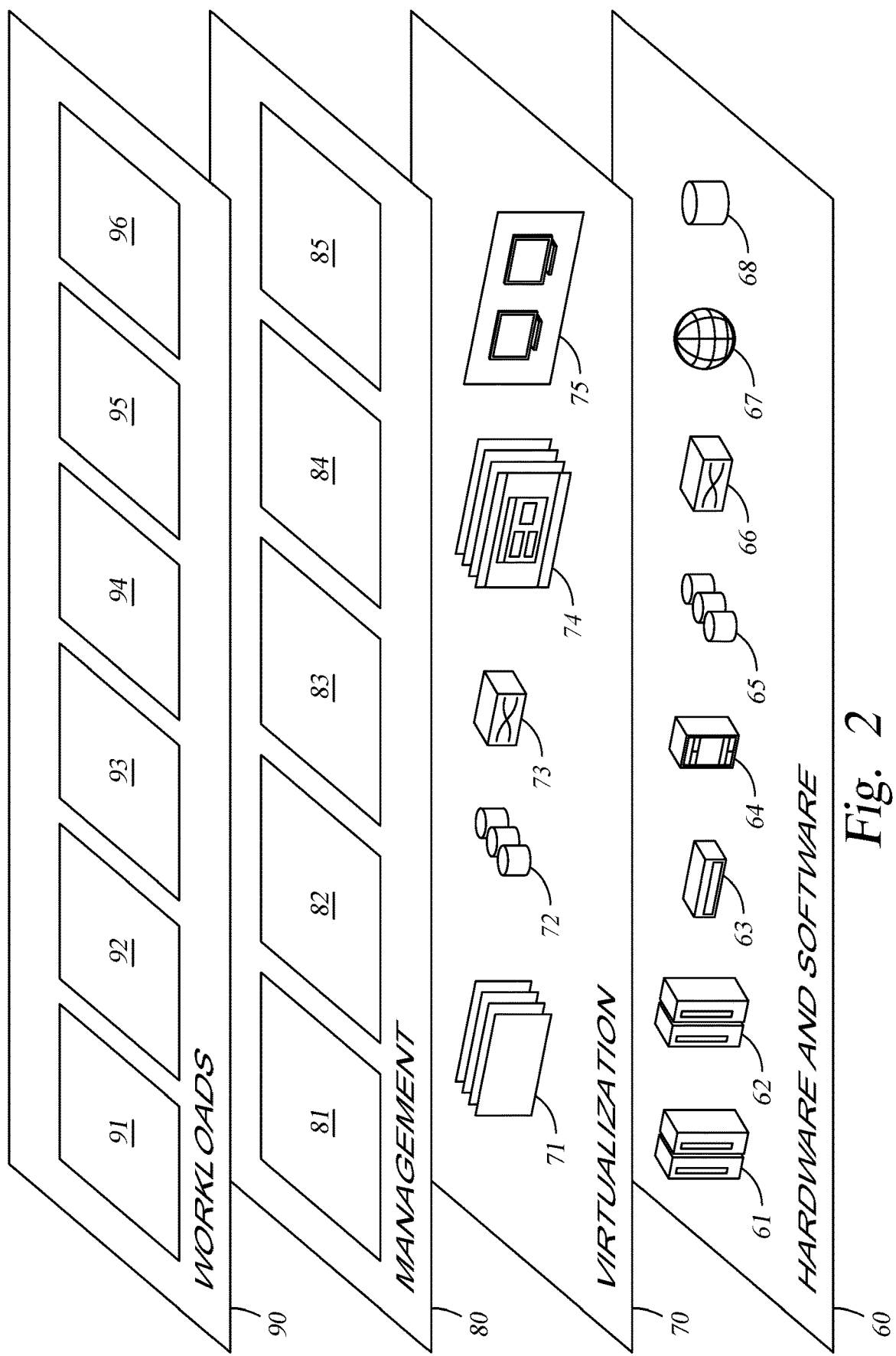
FIG. 2 depicts abstraction model layers according to an embodiment of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96. In embodiments, client workloads may be deployed in this workloads layer 90.

Figure 3:
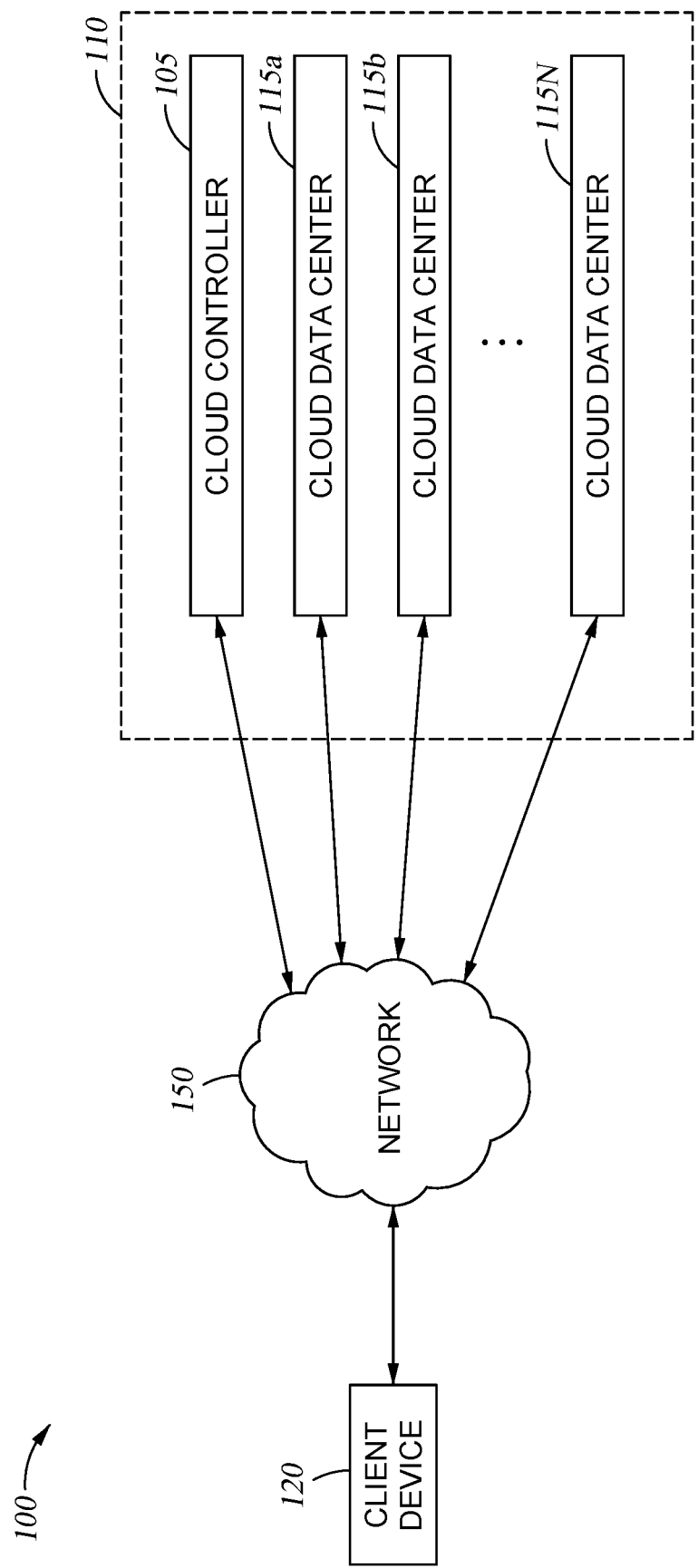
FIG. 3 illustrates a system configured to optimally deploy workloads, according to one embodiment disclosed herein.

FIG. 3 illustrates a system 100 configured to optimally deploy workloads, according to one embodiment disclosed herein. The system 100 includes a Cloud System 110 and a Client Device 120, which communicate via a Network 150 (e.g., the Internet). In the illustrated embodiment, the Cloud System 110 includes a Cloud Controller 105, and a number of Cloud Data Centers 115A-N. Although a single Cloud Controller 105 is illustrated, in embodiments, a single Cloud System 110 may include any number of Cloud Controllers 105 to service client requests. Similarly, although three Data Centers 115A-N are illustrated, in embodiments, the Cloud System 110 may include any number of Data Centers 115A-N, spread across any number of geographic regions. Further, in embodiments, each Data Center 115A-N may include any number of servers or any configuration of computing resources, and each Data Center 115A-N may include differing resources. For example, Data Center 115A may include more servers or more powerful servers than Data Center 115B. Similarly, the Data Centers 115A-N may include differing hardware or software resources.

In the illustrated embodiment, each Data Center 115A-N communicates via Network 150. In some embodiments, however, the Cloud Controller 105 may communicate directly with one or more Data Centers 115A-N without use of the Network 150. In an embodiment, any number of Client Devices 120 may communicate with the Cloud Controller 105 to manage deployment of workloads. For example, in an embodiment, each Client Device 120 may provide workload definitions to the Cloud Controller 105, which may then select one or more Data Centers 115A-N to execute the workloads. In some embodiments, the Client Device 120 or other remote devices may communicate directly with the Data Centers 115A-N once the workload is deployed and executing (i.e., without communicating through the Cloud Controller 105).

In embodiments of the present disclosure, the Cloud Controller 105 may select a number of Data Centers 115A-N to deploy the client workload simultaneously. In various embodiments, the Cloud Controller 105 may select Data Centers 115A-N based on a variety of factors, such as historical data associated with each Data Center 115A-N (e.g., historical downtime, latency or bandwidth to various locations, processing power, and the like). Similarly, in an embodiment, the Cloud Controller 105 may consider data associated with the client (e.g., profiles of previous workloads, requirements with respect to performance, latency, bandwidth, and the like). Similarly, in an embodiment, the Cloud Controller 105 may consider information regarding the workload itself (e.g., expected or required resources, performance, and the like).

Once each of the selected Data Centers has deployed and begun execution of the workload, the Cloud Controller 105 may monitor performance metrics regarding each deployment. For example, in various embodiments, the Cloud Controller 105 may monitor latency or bandwidth between each Data Center 115A-N and one or more other locations (e.g., the location of the Client Device 120, or a location of a third party, such as one or more users who will utilize the deployed workload, etc.). Similarly, in an embodiment, the Cloud Controller 105 may monitor performance of each deployed workload. For example, in various embodiments, the Cloud Controller 105 may monitor a number of transactions executed per second, latency of one or more transactions (i.e., the amount of time that elapses between the data center receiving a transaction and completing the transaction/returning a result), storage input/output operations per second, and the like.

Based on these collected performance metrics, in an embodiment, the Cloud Controller 105 can select one or more of the best Data Centers 115A-N to execute the workload. In embodiments, the determination of the best Data Centers 115A-N may be based on workload information provided by the client. For example, the client may specify that latency to a particular identified location is the most important metric, or that performance in terms of transactions per second is the most important metric. Similarly, in embodiments, a client may specify multiple metrics to consider, with appropriate weighting as to the importance of each metric. In some embodiments, if the client does not provide criteria for determining the most optimal Data Center(s) 115A-N, the Cloud Controller 105 may select and apply predefined criteria based on the type of workload, identity of the client, and the like.

In some embodiments, the Cloud Controller 105 ranks the performance of each Data Center 115A-N, and selects one or more of the Data Centers 115A-N to retain the workload. That is, in an embodiment, the client may specify that the workload should remain on the best two servers or Data Centers 115A-N, or any other number. In such an embodiment, the Cloud Controller 105 selects the best two (or other corresponding number) Data Centers 115A-N for continued execution of the workload. In some embodiments, the Cloud Controller 105 also verifies that the client has sufficient permissions to deploy the workload on more than one Data Center 115A-N. Once the one or more optimal Data Centers 115A-N have been identified, the workload executing on each of the remaining Data Centers 115A-N can be removed, while the workload remains deployed on the identified optimal Data Centers 115A-N. Advantageously, this allows for rapid identification of the best Data Center 115A-N for executing the particular workload at the time of deployment. This improves the functionality of the Cloud System 110 by improving resource efficiency and utilization, and improves the service provided to the client.

Figure 4:
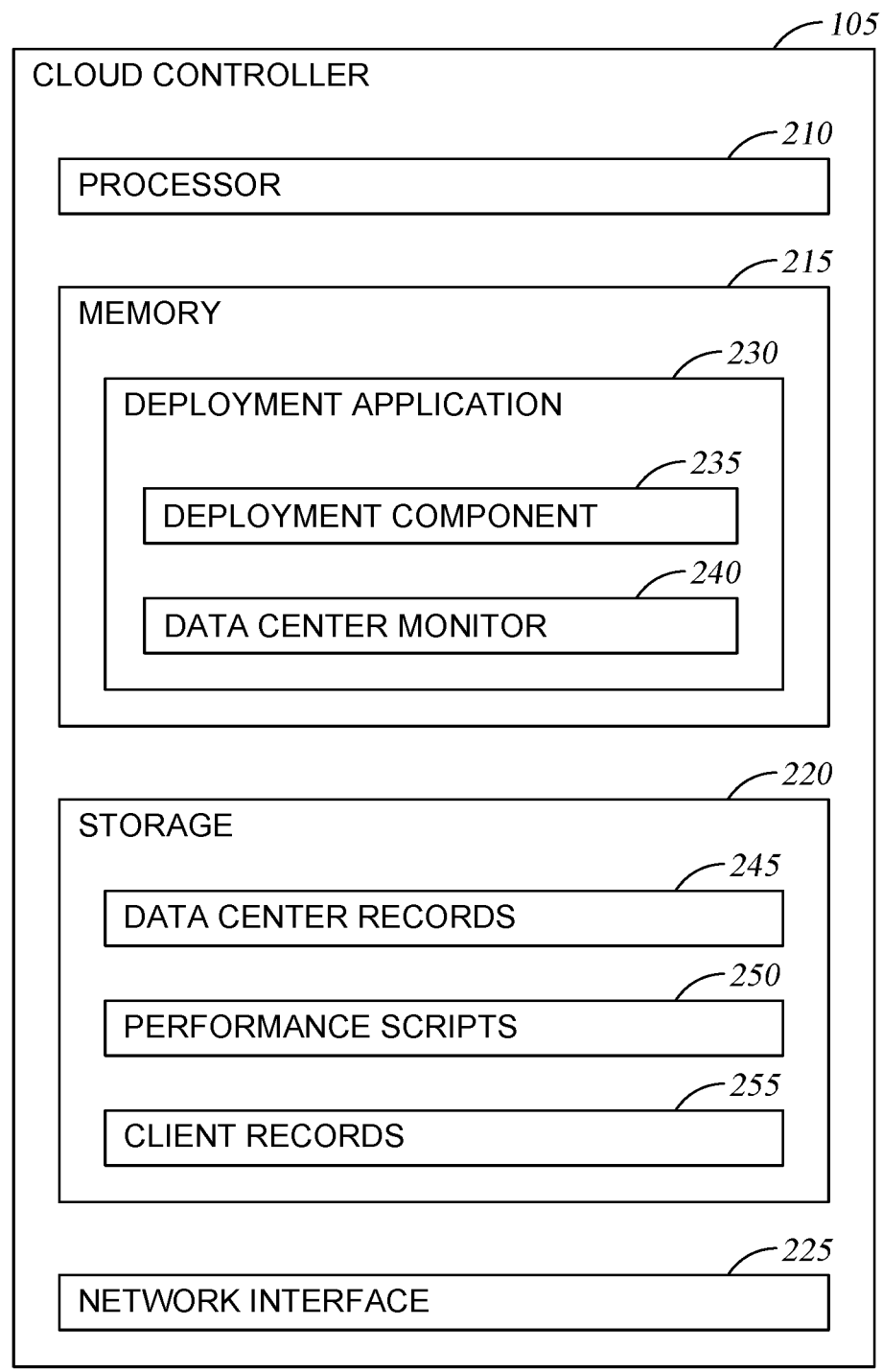
FIG. 4 is a block diagram of a cloud controller configured to aid in deployment of workloads, according to one embodiment disclosed herein.

FIG. 4 is a block diagram of a Cloud Controller 105 configured to aid in deployment of workloads, according to one embodiment disclosed herein. As illustrated, the Cloud Controller 105 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Through the Network Interface 225, the Cloud Controller 105 may be communicatively coupled with other remote devices, including client devices, data centers, and the like.

In the illustrated embodiment, the Storage 220 includes Data Center Records 245 corresponding to Data Centers 115 that are under the purview of the Cloud Controller 105, one or more Performance Scripts 250, and one or more Client Records 255, corresponding to each client of the cloud provider. In some embodiments, these records may reside in other locations as well, such as in Memory 215, or across one or more devices in the cloud system. In various embodiments, the Data Center Records 245 may include information about the geographic location of the corresponding Data Center 115, resources available at the Data Center 115, historical performance statistics of each Data Center 115 (e.g., down time, latency and bandwidth to specific locations, etc.), and the like. In an embodiment, the Client Records 255 may include information about the respective client, such as permissions or privileges of the client (e.g., how many workload deployments can be initiated by the client, either permanently or as temporary test deployments), historical usage statistics of workloads belonging to the client, and the like.

In one embodiment, the Performance Scripts 250 include tests to run against deployed workloads in the cloud. For example, the Performance Scripts 250 may include one or more scripts to determine the performance of a deployed workload. In embodiments, the performance of the workload may include metrics such as the number of transactions the workload can complete in a specified time frame, the latency of a given transaction, a number of storage input/output (I/O) operations per second that can be completed, network latency and/or bandwidth between the deployed workload and one or more specified locations or devices (e.g., the client's location, a location of a customer of the client, etc.), and the like. In an embodiment, a transaction refers to any interaction with the deployed workload. For example, a transaction may include processing of uploaded data, responses to client or customer requests, and the like.

As illustrated, the Memory 215 includes a Deployment Application 230 which optimizes deployment of client workloads in order to ensure that each workload is deployed on one or more data centers that are the best fit for the workload. In embodiments, this determination can be made based on a variety of performance metrics, which may be specified by the client. As illustrated, the Deployment Application 230 includes a Deployment Component 235 and a Data Center Monitor 240. In an embodiment, the Deployment Component 235 receives requests to deploy client workloads, identifies one or more candidate data centers to test deployment of the workload, and deploys the workload on the identified candidate data centers. In various embodiments, the Deployment Component 235 may select the candidate data centers based on a variety of factors. For example, in some embodiments, the client may specify one or more data centers which should be used to test the deployment. Similarly, the client may specify one or more geographic regions or locations, or one or more customers or devices, which will rely on the deployed workload.

In some embodiments, the Deployment Component 235 may also consider a configuration of each data center when determining which data center(s) to test deployment on. For example, the Deployment Component 235 may analyze the Data Center Records 245 to identify one or more Data Centers 115 with sufficient resources to execute the client workload, based on current and/or historical loads at each Data Center 115. In some embodiments, the Deployment Component 235 may also consider historical performance of each Data Center 115, including its latency or bandwidth to specific locations, or its general performance (such as in terms of instructions or transactions completed per second, latency of each transaction, and the like).

In some embodiments, the Deployment Component 235 may further consider a configuration of the client that provided the workload when identifying the candidate sites.

In an embodiment, the Deployment Component 235 may analyze the Client Record 255 corresponding to the client that requested the workload be deployed. For example, based on the Client Record 255, the Deployment Component 235 may determine a maximum number of candidate data centers that can be tested. Similarly, the Deployment Component 235 may parse the Client Record 255 to determine candidate data centers based on historical usage of the client, such as geographic locations that were important for previous workloads of the client.

Additionally, in some embodiments, the Deployment Component 235 may analyze information associated with the received workload in order to select the candidate centers. For example, in some embodiments, the client may specify a number of data centers to test, or specify particular data centers to test deployment. Similarly, in some embodiments, the client may specify which performance metrics are important, and the Deployment Component 235 may compare these specified metrics with the historical Data Center Records 245 to identify centers which are likely good candidates for handling the workload. Of course, in various embodiments, any number of methodologies may be utilized to select the candidate data centers on which to test deployment of the client workload. Once candidates have been identified, the Deployment Component 235 deploys the workload to each identified candidate. For example, the Deployment Component 235 may transmit the workload to each candidate center.

In the illustrated embodiment, the Data Center Monitor 240 monitors performance of workloads deployed at each candidate data center, in order to determine the best fit, or the most optimal data center for each workload. For example, in an embodiment, once the Deployment Component 235 has initiated a set of test deployments to one or more data centers, the Data Center Monitor 240 may run one or more Performance Scripts 250 against each deployed workload in order to measure performance metrics. In some embodiments, the Performance Scripts 250 to be run may be provided by the client, and may include test data or sample data to be used in testing the deployments. For example, in one embodiment, sample transaction requests may be provided by the client, which can be utilized to test the performance of each deployed workload. In some embodiments, the client may specify one or more metrics to monitor, and the Data Center Monitor 240 may select corresponding Performance Scripts 240 to test those metrics.

In an embodiment, the Data Center Monitor 240 utilizes the collected performance metrics to identify one or more optimal data centers for the workload. In some embodiments, the number of data centers to retain the deployed workload on is determined based on client instruction or a client configuration. In an embodiment, the Deployment Component 235 then terminates and removes the workload from each data center that is not selected to retain the workload. In some embodiments, this testing process is completed for newly received workloads at deployment time, and is not repeated. For example, in such an embodiment, once the optimal data center(s) is determined at deployment time, the workload will remain executing on those identified data center(s) until it is either terminated by the client, or some other predefined condition occurs.

In some embodiments, however, the Deployment Application 230 may occasionally reassess the performance of each data center, in order to determine if the workload should be migrated to one or more other data centers. For example, in one embodiment, the Deployment Application 230 periodically reassesses the performance metrics of the deployed workload (which may involve initiating additional temporary deployments). This periodic assessment may occur, for example, once a day, once a week, and the like. In some embodiments, the Deployment Application 230 may perform such reassessment at the request of the client, or some other predefined triggering action or condition. In one embodiment, for example, the Deployment Application 230 may reassess the deployment if the workload changes in some way (e.g., increased traffic or transactions, or relocation of the client or customers of the client who use the workload), or if the cloud system changes (e.g., adding, removing, failing, or restoring of servers, data centers, resources, and the like).

Figure 5A:
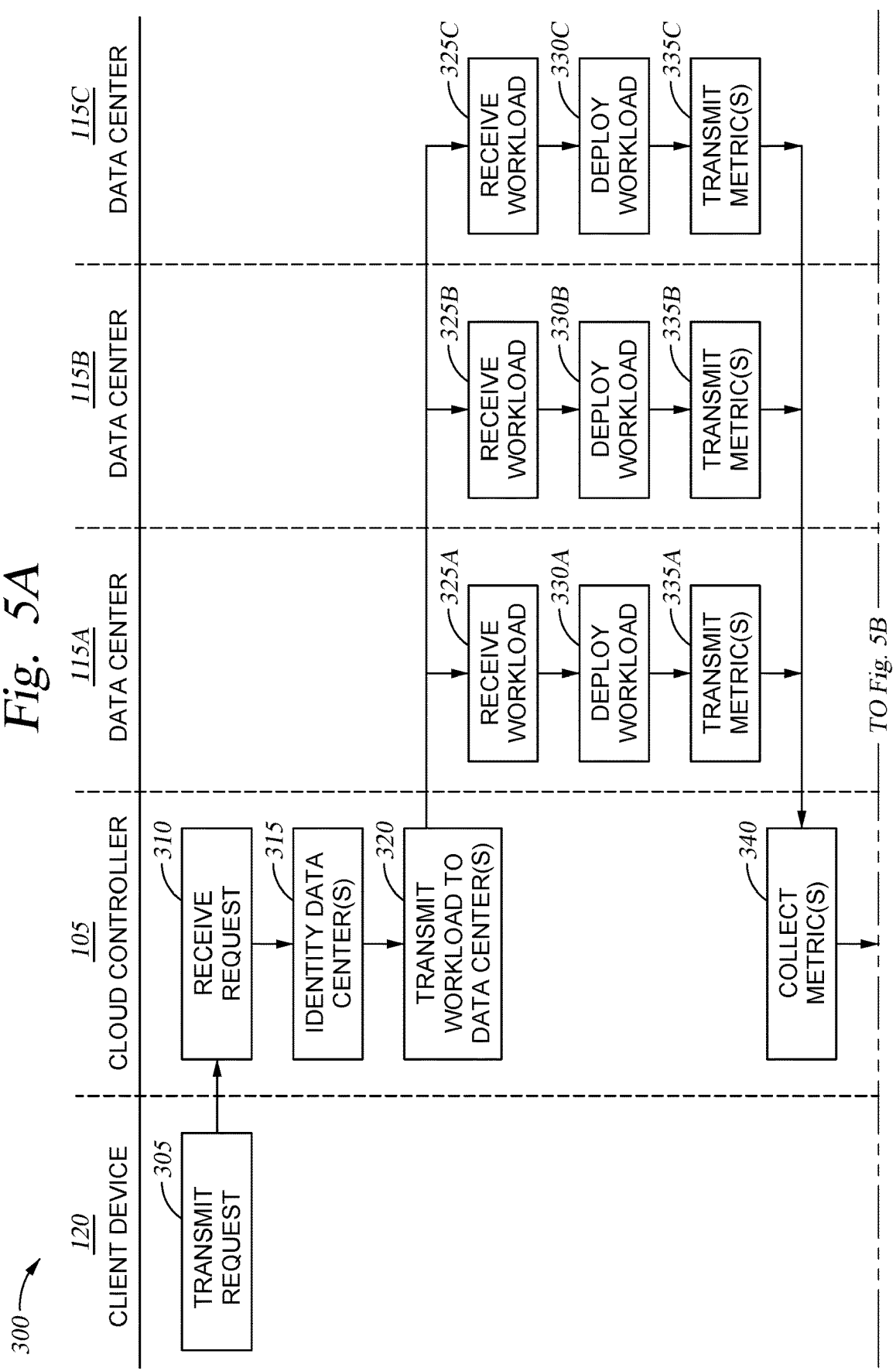
FIGS. 5A and 5B illustrate a workflow for optimal deployment of workloads, according to one embodiment disclosed herein.
Figure 5B:
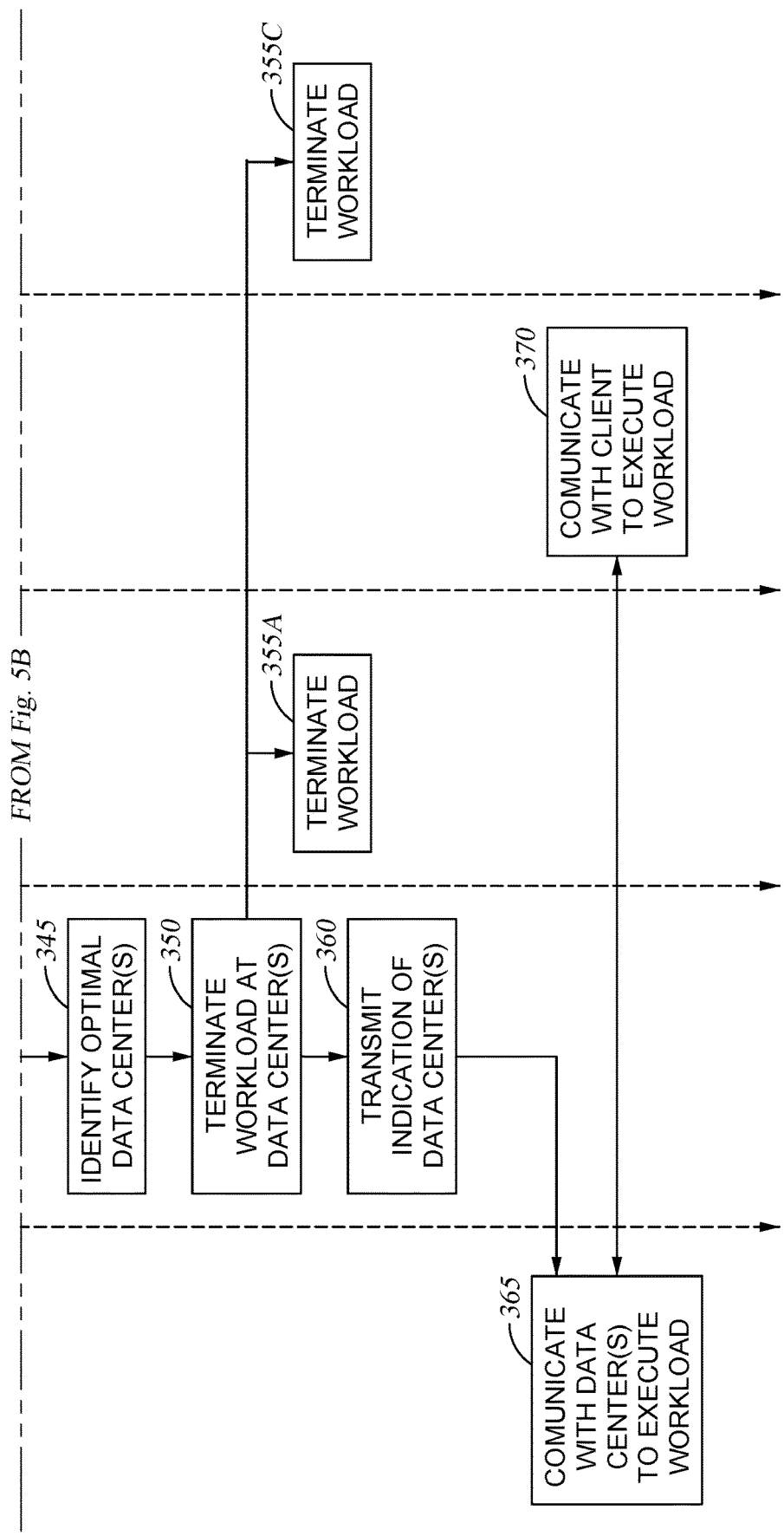

FIGS. 5A and 5B illustrate a workflow 300 for optimal deployment of workloads, according to one embodiment disclosed herein. In the illustrated workflow 300, various devices are included at the top of five vertical columns, with the actions or operations corresponding to each device located within the respective column. As illustrated by the dotted arrows, time passes beginning from the top and moving towards the bottom of the page, such that an operation occurring further towards the bottom of the workflow 300 is occurring later in time, relative to a higher operation. The illustrated workflow is divided between FIGS. 5A and 5B, for the sake of clarity. As illustrated in FIG. 5A, the workflow 300 includes a Client Device 120, Cloud Controller 105, and three Data Centers 115A-C. Although a single Client Device 120 is illustrated, in some embodiments, multiple Client Devices 120 may be involved in a given workload deployment. Similarly, although the illustrated embodiment includes a single Cloud Controller 105, in some embodiments, multiple Cloud Controllers 105 may be involved in the deployment of a client workload. Additionally, although three Data Centers 115A-C are illustrated, any number of Data Centers 115A-C may be involved in workload deployment.

In the illustrated embodiment, the workflow 300 begins in FIG. 5A at block 305, where the Client Device 120 transmits, to one or more Cloud Controllers 105, a request to deploy one or more workloads. At block 310, the Cloud Controller(s) 105 receive the request to deploy the workload to the cloud, and at block 315, the Cloud Controller 105 identifies one or more Data Centers 115A-C on which to test deployment of the workload. In some embodiments, the workload request may include an indication of one or more Data Centers 115A-C to test deployment on. In such an embodiment, identifying the candidate Data Center(s) 115A-C may include determining whether the request indicated any particular Data Center(s) 115A-C. In some embodiments, the Cloud Controller identifies candidate Data Centers 115A-C based on a configuration of the Client Device 120 (or of the particular client associated with the Client Device 120), other information included in the workload request, configurations of each of the Data Centers 115A-C, and the like.

In one embodiment, the Cloud Controller 105 may determine how many Data Centers 115A-C to test deployment of the workload based on a configuration of the requesting client. For example, the Cloud Controller 105 may determine that the requesting client is allowed to test simultaneous deployment on three or fewer Data Centers 115A-C at any given point in time. Similarly, in some embodiments, the Cloud Controller 105 may determine how many workloads are currently deployed for the requesting client, and determine the number of candidate Data Centers 115A-C to select based in part on this value. In some embodiments, the Cloud Controller 105 may consider information included in the workload request, such as an indication of one or more geographic locations (or one or more identified computing devices) that will rely on the deployed workload. For example, in such an embodiment, the Cloud Controller 105 may select one or more Data Centers 115A-C that are located near the identified devices or locations, either geographically or based on a network topology.

In some embodiments, the Cloud Controller 105 may also consider processing requirements, latency requirements, and the like included with the requested workload. In a related embodiment, the Cloud Controller 105 may analyze information about each Data Center 115A-C to determine whether it can satisfy the workload's stated requirements. For example, in various embodiments, this information may include resources available at the Data Center 115A-C, current and historical load at the Data Center 115A-C, current and historical latency and bandwidth to specified locations, and the like. As illustrated in the workflow 300, once one or more candidate Data Centers 115A-C are identified, the Cloud Controller 105 transmits the workload to each of the candidate Data Centers 115A-C at block 320.

In the illustrated embodiment, the Cloud Controller 105 identified each of Data Centers 115A-C as a candidate for full deployment of the workload. Of course, in various embodiments, the Cloud Controller 105 may select more or fewer data centers based on a variety of factors, such as the client's configuration, a predefined maximum or minimum value set by an administrator, and the like. As illustrated, the workload is transmitted to each of the candidate Data Centers 115A-C effectively simultaneously. That is, in the illustrated embodiment, the Cloud Controller 105 transmits the workload to each identified candidate Data Center 115A-C, without waiting for the workload to be deployed or tested by any Data Center 115A-C before transmitting it to the remaining identified candidates.

As illustrated by blocks 325A-C, each of the Data Centers 115A-C similarly receive the workload effectively simultaneously (depending on the latency of the network). Further, as illustrated in the workflow 300, each candidate Data Center 115A-C deploys the client workload at blocks 330A-C. That is, the workload is deployed and instantiated on one or more servers located in each Data Center 115A-C, and begins execution on each Data center 115A-C. In this way, after completion of blocks 330A-C, the client workload is running on each of the identified candidate Data Centers 115A-C. At blocks 335A-C, each of the candidate Data Centers 115A-C monitors and transmits performance metrics back to the Cloud Controller 105. In some embodiments, the particular performance metrics harvested are determined based on one or more performance scripts or performance metrics identified as relevant by the Cloud Controller 105, which may be indicated in the transmitted workload to each Data Center 115A-C.

In one embodiment, the client may specify one or more relevant performance metrics when transmitting the workload request to the Cloud Controller 105. The Cloud Controller 105 may then select appropriate test scripts based on the metrics that are important to the client. Additionally, in some embodiments, if the workload does not specify any performance metrics to monitor, the Cloud Controller 105 may select one or more metrics to monitor based on a configuration of the client, historical preferences of the client, analysis of the workload, and the like. Similarly, in some embodiments, the Cloud Controller 105 may select one or more predefined default metrics to analyze. In the illustrated embodiment, each Data Center 115A-C transmits one or more performance metrics to the Cloud Controller 105 for analysis.

In some embodiments, one or more of the performance metrics may require additional devices to collect and monitor the metric. For example, metrics such as the latency or bandwidth to or from a specified location may require the Cloud Controller 105 to identify one or more remote devices to transmit/receive transactions or other data to and from each identified Data Center 115A-C. In one embodiment, when a particular location or device is specified by the client, the Cloud Controller 105 may identify one or more devices that are located near the specified devices in the network topology, and monitor the metrics to and from these identified devices. In some embodiments, the Cloud Controller 105 may transmit an indication of each candidate Data Center 115 to any devices specified by the client, and allow these devices to transmit and receive testing data to and from the deployed workloads in order to monitor the performance metrics. In various embodiments, the resulting metrics may be transmitted by the identified devices and/or by the Data Centers 115A-C to the Cloud Controller 105.

At block 340, the Cloud Controller 105 collects all of the relevant metrics. For example, as discussed above, this may involve requesting and/or receiving one or more identified performance metrics from each candidate Data Center 115A-C, from one or more remote devices, and the like. The workflow 300 then continues to block 345 of FIG. 5B, where the Cloud Controller 105 identifies one or more optimal Data Centers 115A-C. In some embodiments, the Cloud Controller 105 may allow a predefined period of time to pass before identifying the optimal Data Center(s) 115A-C, or may allow a predefined number of transactions to be completed before making such a determination. In some embodiments, if more than one metric is to be considered, the client may specify a weighting of each performance metric when identifying the best fit for the workload. If no weighting is specified, the Cloud Controller 105 may determine its own weighting (e.g., based on historical data associated with the client or with other clients), or may assign them equal weight.

In some embodiments, the Cloud Controller 105 may select multiple optimal Data Centers 115A-C for a given client workload. For example, in some embodiments, the client may specify that the workload should remain deployed on two or more Data Centers 115A-C (e.g., for redundancy and fail-safe purposes). In some embodiments, the Cloud Controller 105 may analyze the configuration of the client to determine how many workloads should remain deployed. In embodiments, the Cloud Controller 105 may rank each candidate Data Center 115A-C based on the performance metrics, and select the Data Centers 115A-C with the best fit or performance to retain the workload. At block 350, the Cloud Controller 105 terminates the workload at the remaining candidate Data Centers 115A-C that were not selected to retain deployment. In the illustrated embodiment, only a single Data Center 115B was selected to retain the workload, while Data Centers 115A and 115C were culled. As illustrated by blocks 355A and 355C, the Data Centers 115A and 115C terminate and remove the client workload upon receiving this instruction from the Cloud Controller 105, such that the workload remains executing on only the identified optimal Data Center(s) 115B. In this way, the computing resources of the non-selected Data Centers 115A and 115C are freed for processing of other workloads.

In some embodiments, the client may specify one or more Data Centers 115A-C to deploy the workload on, regardless of the performance metrics. For example, a client may request that the workload be deployed on a particular Data Center 115A-C, as well as one additional Data Center 115A-C, to be determined based on the performance metrics. In such an embodiment, the Cloud Controller 105 may determine the most optimal Data Center(s) 115A-C other than the specified Data Center 115A-C, and retain the deployment at each of these Data Centers 115A-C.

At block 360, the Cloud Controller 105 transmits an indication of the Data Center(s) 115B that are continuing to execute the client workload. In blocks 365 and 370, the Client Device 120 and optimal Data Center 115B then proceed to communicate with each other in the normal execution of the workload. In some embodiments, this execution may also involve communicating with one or more remote devices, as well. For example, one or more colleagues, customers, or clients of the client who requested the workload may proceed to communicate with the Data Center 115B during ordinary execution of the workload. As discussed above, this workload may include receiving and processing transaction requests from remote devices, such as to update or process data, as well as returning results to the requesting device.

Figure 6:
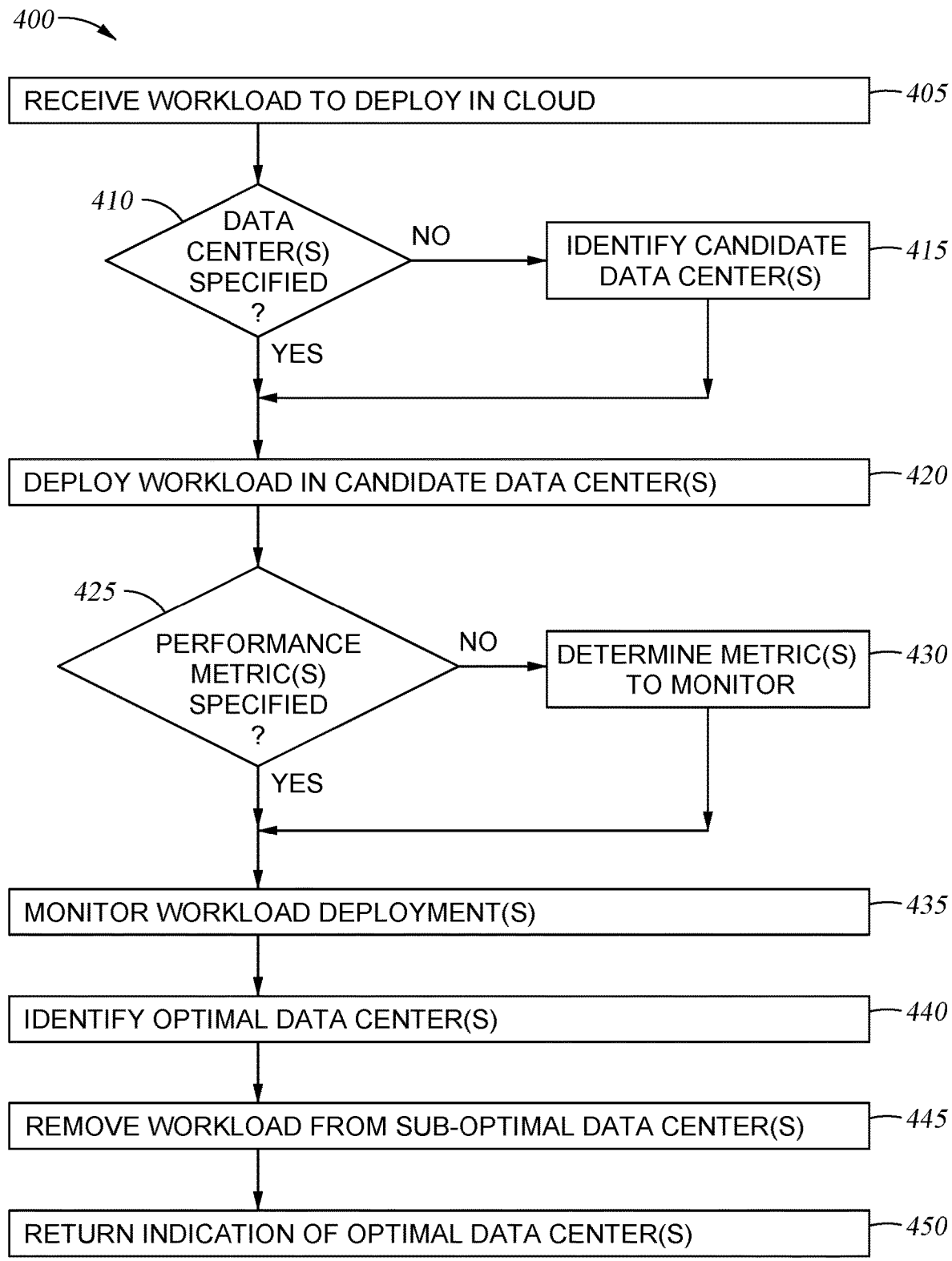
FIG. 6 is a flow diagram illustrating a method of optimally deploying workloads, according to one embodiment disclosed herein.

FIG. 6 is a flow diagram illustrating a method 400 of optimally deploying workloads, according to one embodiment disclosed herein. The method 400 begins at block 405, where the Cloud Controller 105 receives a workload from a client to be deployed in the cloud. At block 410, the Cloud Controller 105 determines whether the client has specified one or more data centers on which to test deployment of the workload. If not, the method 400 proceeds to block 415, where the Cloud Controller 105 identifies one or more candidate data centers. Additionally, if the client has specified one or more data centers, but requests that the deployment be additionally tested on one or more other data centers to be identified by the Cloud Controller 105, the method 400 proceeds to block 415. If the client has specified all of the data centers on which to test the deployment, the method 400 proceeds to block 420, where the Cloud Controller 105 deploys the workload to each candidate data center for testing.

The method 400 then proceeds to block 425, where the Cloud Controller 105 determines whether the client specified any performance metrics to test. Of course, in some embodiments, this determination may be made prior to deploying the workload, or prior to identifying candidate data centers. For example, in some embodiments, the identification of the candidate data centers may be based at least in part on the performance metrics that the client has identified, and deploying the workload to each candidate may involve transmitting an indication of which metrics to monitor, or applying one or more performance scripts. If the client did not specify a performance metric, the method 400 proceeds to block 430, where the Cloud Controller 105 determines one or more metrics to monitor. For example, as discussed above, this may be based on predefined metrics, a configuration or history of the client, and the like. The method 400 then proceeds to block 435. Additionally, if the client specified one or metrics to monitor, the method 400 continues to block 435. In some embodiments, even if the client specified one or more metrics, the Cloud Controller 105 may select additional metrics based on the client configuration or other factors.

In block 435, the Cloud Controller 105 monitors performance metrics for each of the deployed workloads at each candidate data center. At block 440, the Cloud Controller 105 identifies one or more optimal data center(s), based on the performance metrics. As discussed above, in various embodiments, the Cloud Controller 105 may determine the optimal data centers after a predefined period of time has passed, after a predefined number of transactions or operations have been completed, and the like. The method 400 then proceeds to block 445, where the Cloud Controller 105 removes the workload from all of the data centers other than the identified optimal data center(s). Finally, the method 400 continues to block 450, where the Cloud Controller 105 transmits, to the client device, an indication of the optimal data center(s) where the client workload remains. The client may then access the workload as normal.

Figure 7:
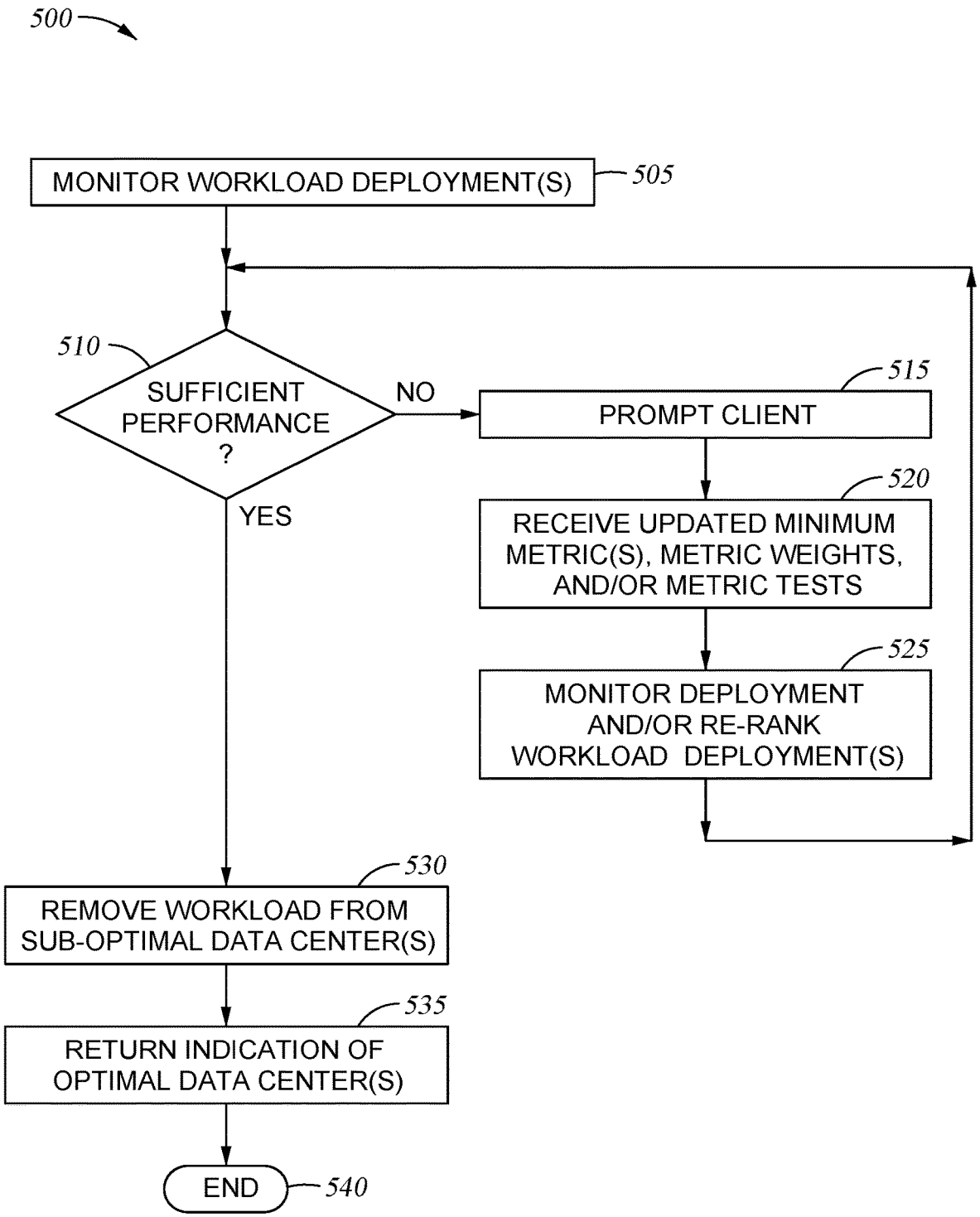
FIG. 7 is a flow diagram illustrating a method for optimally deploying workloads, according to one embodiment disclosed herein.

FIG. 7 is a flow diagram illustrating a method 500 for optimally deploying workloads, according to one embodiment disclosed herein. In some embodiments, in addition to specifying which performance metrics to consider when identifying the optimal data center(s), the client may also specify one or more minimum performance metrics. In such an embodiment, the Cloud Controller 105 may also determine whether the performance metrics at the optimal data center(s) exceed these predefined minimum thresholds. The method 500 begins at block 505, where the Cloud Controller 105 monitors the deployed workloads on each candidate data center. In the illustrated flow diagram, the Cloud Controller 105 has already identified candidate data centers, and deployed the workload to each candidate. At block 510, the Cloud Controller 105 determines whether any of the candidate data centers meet the performance thresholds. If so, the method 500 proceeds to block 530 where the Cloud Controller 105 removes the workload from each sub-optimal data center. The method 500 then continues to block 535, where the Cloud Controller 105 transmits an indication of the data center(s) where the workload remains executing to the client, and the method 500 terminates at block 540.

If, at block 510, it is determined that even the best data center (i.e., the data center with the best performance metrics, as determined by the metrics identified as important and appropriate weighting of each metric) is insufficient, the method 500 proceeds to block 515, where the Cloud Controller 105 notifies the client and prompts the client for a decision as to how to proceed. At block 520, the Cloud Controller 105 receives the client's selection, which may include updated minimum metrics, new weights to assign each metric, or new tests/metrics to monitor. Depending on this update, at block 525, the Cloud Controller 105 may begin to monitor the deployment anew, and/or re-rank the data centers based on the metrics already retrieved. The method 500 then returns to block 510 to determine whether one or more data centers satisfy the updated requirements. Additionally, in some embodiments, the client may indicate that the workload should be terminated without full deployment.

Figure 8:
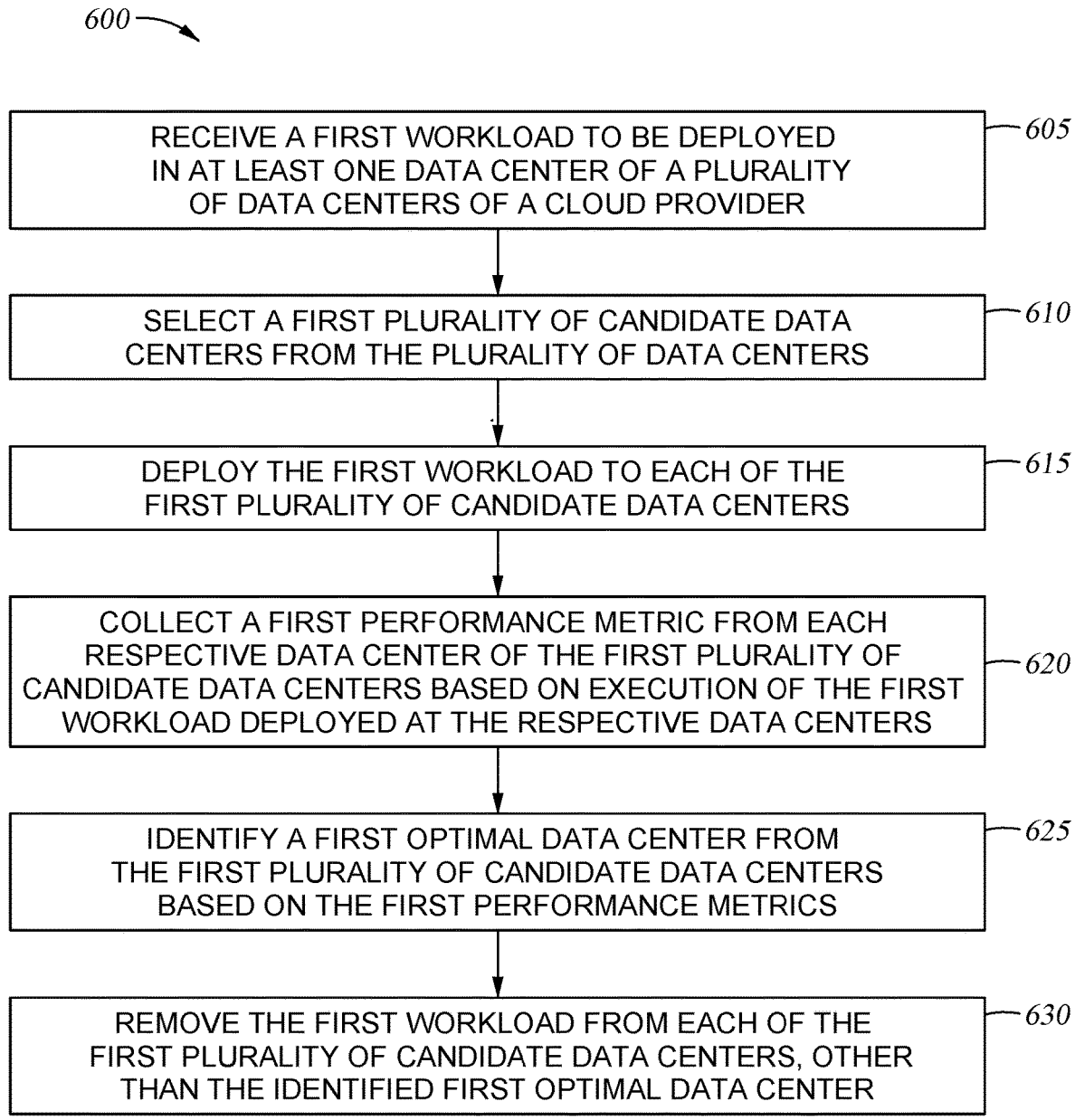
FIG. 8 is a flow diagram illustrating a method for optimally deploying workloads, according to one embodiment disclosed herein.

FIG. 8 is a flow diagram illustrating a method 600 for optimally deploying workloads, according to one embodiment disclosed herein. The method 600 begins at block 605, where the Cloud Controller 105 receives a first workload to be deployed in at least one data center of a plurality of data centers. At block 610, the Cloud Controller 105 selects a first plurality of candidate data centers from the plurality of data centers. The method 600 then proceeds to block 615, where the Cloud Controller 105 deploys the first workload to each of the first plurality of candidate data centers. At block 620, the Cloud Controller 105 collects a first performance metric from each respective data center of the first plurality of candidate data centers based on execution of the first workload deployed at the respective data centers. The method 600 continues to block 625, where the Cloud Controller 105 identifies a first optimal data center from the first plurality of candidate data centers based on the first performance metrics. Finally, at block 630, the Cloud Controller 105 removes the first workload from each of the first plurality of candidate data centers, other than the identified first optimal data center.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Deployment Application 230) or related data available in the cloud. For example, the Deployment Application 230 could execute on a computing system in the cloud and conduct simultaneous deployment of workloads to multiple data centers. In such a case, the Deployment Application 230 could identify candidate data centers and monitor temporary deployments at each candidate data center, and store performance scripts at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving a first workload to be deployed in at least one data center of a plurality of data centers;
selecting a first plurality of candidate data centers from the plurality of data centers;
deploying, by operation of one or more computer processors, the first workload to each of the first plurality of candidate data centers, wherein, responsive to the deployment, each of the first plurality of candidate data centers begins executing the first workload;
collecting a first performance metric from each respective data center of the first plurality of candidate data centers, wherein the first performance metric is generated based on the execution of the first workload deployed at each respective data center, wherein executing the first workload at the respective data center comprises processing test data using the deployed first workload;
identifying a first optimal data center from the first plurality of candidate data centers based on the first performance metrics; and
removing the deployed first workload from each of the first plurality of candidate data centers, other than the identified first optimal data center, wherein each of the first plurality of candidate data centers other than the first optimal data center cease execution of the first workload, and wherein the first optimal data center proceeds to process client data using the deployed first workload.

2. The method of claim 1, wherein selecting the first plurality of candidate data centers is based at least in part on workload information included with the first client workload.

3. The method of claim 1, the method further comprising collecting a second performance metric from each respective data center of the first plurality of candidate data centers based on execution of the first client workload deployed at the respective data centers, wherein identifying the first optimal data center from the first plurality of candidate data centers is further based on the second performance metrics.

4. The method of claim 1, wherein the first performance metric is specified in the first client workload.

5. The method of claim 1, wherein the first performance metric for each respective data center comprises a measure of latency between a first location and a location of the respective data center.

6. The method of claim 5, wherein the first location is specified in the first client workload.

7. The method of claim 1, wherein the first performance metric for each respective data center comprises a measure of bandwidth between a first location and a location of the respective data center.

8. The method of claim 1, wherein the first performance metric for each respective data center comprises at least one of:

(i) a number of transactions per second completed by the respective data center;
(ii) a number of input/output operations per second completed by the respective data center; and
(iii) a latency of one or more transactions at the respective data center.

9. The method of claim 1, the method further comprising:
ranking the first plurality of candidate data centers based on the first performance metric;
identifying a second optimal data center from the first plurality of candidate data centers based on the ranking; and
determining to allow the first client workload to remain executing at the second optimal data center as well as the first optimal data center, based on workload information included with the first client workload.

10. The method of claim 1, the method further comprising transmitting an indication of the identified first optimal data center to a client that provided the first client workload.

11. A computer program product comprising:
a computer-readable storage medium having computer-readable program code embodied therewith, the computer-readable program code executable by one or more computer processors to perform an operation comprising:
receiving a first workload to be deployed in at least one data center of a plurality of data centers;
selecting a first plurality of candidate data centers from the plurality of data centers;
deploying the first workload to each of the first plurality of candidate data centers, wherein, responsive to the deployment, each of the first plurality of candidate data centers begins executing the first workload;
collecting a first performance metric from each respective data center of the first plurality of candidate data centers, wherein the first performance metric is generated based on the execution of the first workload deployed at each respective data center, wherein executing the first workload at the respective data center comprises processing test data using the deployed first workload;
identifying a first optimal data center from the first plurality of candidate data centers based on the first performance metrics; and
removing the deployed first workload from each of the first plurality of candidate data centers, other than the identified first optimal data center, wherein each of the first plurality of candidate data centers other than the first optimal data center cease execution of the first workload, and wherein the first optimal data center proceeds to process client data using the deployed first workload.

12. The computer program product of claim 11, the operation further comprising collecting a second performance metric from each respective data center of the first plurality of candidate data centers based on execution of the first client workload deployed at the respective data centers, wherein identifying the first optimal data center from the first plurality of candidate data centers is further based on the second performance metrics.

13. The computer program product of claim 11, wherein the first performance metric is specified in the first client workload.

14. The computer program product of claim 11, wherein the first performance metric for each respective data center comprises at least one of:

(i) a measure of latency between a first location and a location of the respective data center;
(ii) a measure of bandwidth between a first location and a location of the respective data center;
(iii) a number of transactions per second completed by the respective data center;
(iv) a number of input/output operations per second completed by the respective data center; and
(v) a latency of one or more transactions at the respective data center.

15. The computer program product of claim 11, the operation further comprising:
ranking the first plurality of candidate data centers based on the first performance metric;
identifying a second optimal data center from the first plurality of candidate data centers based on the ranking; and
determining to allow the first client workload to remain executing at the second optimal data center as well as the first optimal data center, based on workload information included with the first client workload.

16. A system comprising:
one or more computer processors; and
a memory containing a program which when executed by the one or more computer processors performs an operation, the operation comprising:
receiving a first workload to be deployed in at least one data center of a plurality of data centers;
selecting a first plurality of candidate data centers from the plurality of data centers;
deploying the first workload to each of the first plurality of candidate data centers, wherein, responsive to the deployment, each of the first plurality of candidate data centers begins executing the first workload;
collecting a first performance metric from each respective data center of the first plurality of candidate data centers, wherein the first performance metric is generated based on the execution of the first workload deployed at each respective data center, wherein executing the first workload at the respective data center comprises processing test data using the deployed first workload;
identifying a first optimal data center from the first plurality of candidate data centers based on the first performance metrics; and
removing the deployed first workload from each of the first plurality of candidate data centers, other than the identified first optimal data center, wherein each of the first plurality of candidate data centers other than the first optimal data center cease execution of the first workload, and wherein the first optimal data center proceeds to process client data using the deployed first workload.

17. The system of claim 16, the operation further comprising collecting a second performance metric from each respective data center of the first plurality of candidate data centers based on execution of the first client workload deployed at the respective data centers, wherein identifying the first optimal data center from the first plurality of candidate data centers is further based on the second performance metrics.

18. The system of claim 16, wherein the first performance metric is specified in the first client workload.

19. The system of claim 16, wherein the first performance metric for each respective data center comprises at least one of:

(i) a measure of latency between a first location and a location of the respective data center;
(ii) a measure of bandwidth between a first location and a location of the respective data center;
(iii) a number of transactions per second completed by the respective data center;
(iv) a number of input/output operations per second completed by the respective data center; and
(v) a latency of one or more transactions at the respective data center.

20. The system of claim 16, the operation further comprising:
   ranking the first plurality of candidate data centers based on the first performance metric;
   identifying a second optimal data center from the first plurality of candidate data centers based on the ranking; and
   determining to allow the first client workload to remain executing at the second optimal data center as well as the first optimal data center, based on workload information included with the first client workload.

\* \* \* \* \*